US012717867B2

(12) United States Patent
Park et al.

(10) Patent No.: US 12,717,867 B2
(45) Date of Patent: Aug. 25, 2026

(54) METHOD AND APPARATUS WITH NETWORK INTEROPERABILITY PROCESSING

(71) Applicant: Samsung Electronics Co., Ltd., Suwon-si (KR)

(72) Inventors: Hyunsun Park, Suwon-si (KR); Yoojin Kim, Suwon-si (KR); Junwoo Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1327 days.

(21) Appl. No.: 16/896,500

(22) Filed: Jun. 9, 2020

(65) Prior Publication Data

US 2021/0174178 A1 Jun. 10, 2021

(30) Foreign Application Priority Data

Dec. 6, 2019 (KR) ........................ 10-2019-0161677

(51) Int. Cl.
*G06F 17/16* (2006.01)
*G06F 17/15* (2006.01)

(52) U.S. Cl.
CPC ............ *G06F 17/16* (2013.01); *G06F 17/153* (2013.01)

(58) Field of Classification Search
CPC ........ G06F 21/64; G06F 18/213; G06F 7/762; G06F 7/76; G06F 7/768; G06F 7/78; G06F 7/785; G06F 7/22; G06F 7/24; G06F 7/26; G06F 7/32; G06F 7/36; G06F 17/15–153; G06N 3/063; G06N 3/045; G06N 3/08; G06N 3/04; G06N 3/0464; G06N 3/0475; G06N 3/0495; G06N 3/0499; G06N 3/047; G06N 3/0455; G06N 3/0895; G06N 3/09; G06N 3/091; G06N 3/092; G06N 3/094; G06N 3/096; G06N 3/098; G06N 3/0985
See application file for complete search history.

(56) References Cited

U.S. PATENT DOCUMENTS 11,762,946 B1 * 9/2023 Goldman ................ G06F 17/16 708/209
2018/0032796 A1 2/2018 Kuharenko et al.
(Continued)

FOREIGN PATENT DOCUMENTS

CN 110471883 A 11/2019
KR 10-2018-0109619 A 10/2018
(Continued)

OTHER PUBLICATIONS

Li, Weifu. "Design of Hardware Accelerators for Hierarchical Temporal Memory and Convolutional Neural Network." ProQuest Dissertations Publishing, 2019. (Year: 2019).*
(Continued)

*Primary Examiner* — Andrew Caldwell
*Assistant Examiner* — Huy Duong
(74) *Attorney, Agent, or Firm* — NSIP Law

(57) ABSTRACT

A method of processing data includes manipulating input data based on a configuration of the input data and a configuration of hardware for processing the input data to generate manipulated data; rearranging the manipulated data based on sparsity of the manipulated data to generate rearranged data; and processing the rearranged data to generate output data.

22 Claims, 15 Drawing Sheets

(56) References Cited

U.S. PATENT DOCUMENTS

| | | | | |
|---|---|---|---|---|
| 2018/0046437 | A1* | 2/2018 | Lo | G06N 3/082 |
| 2018/0046898 | A1 | 2/2018 | Lo | |
| 2018/0285715 | A1 | 10/2018 | Son et al. | |
| 2020/0125922 | A1* | 4/2020 | Young | G06N 3/045 |
| 2020/0257974 | A1* | 8/2020 | Yano | G06F 17/18 |
| 2020/0285887 | A1 | 9/2020 | Lee et al. | |
| 2021/0125071 | A1* | 4/2021 | Ren | G06N 3/04 |
| 2021/0319076 | A1* | 10/2021 | Komuravelli | G06F 17/16 |
| 2022/0083843 | A1* | 3/2022 | Raha | G06N 3/045 |
| 2023/0244942 | A1* | 8/2023 | Yu | G06N 3/063 706/15 |

FOREIGN PATENT DOCUMENTS

| | | |
|---|---|---|
| KR | 10-2019-0022237 A | 3/2019 |
| WO | WO 2019/157599 A1 | 8/2019 |

OTHER PUBLICATIONS

Zhang, Xiangyu, et al. "ShuffleNet: An Extremely Efficient Convolutional Neural Network for Mobile Devices." 2018 IEEE/CVF Conference on Computer Vision and Pattern Recognition, IEEE, 2018, pp. 6848-6856. (Year: 2018).*

Yugovich, Baron. 'greyscale image to 3 channels'. In stackoverflow.com [online]. Aug. 11, 2018; 20:46 [retrieved on Oct. 16, 2023]. Retrieved from the Internet: < https://stackoverflow.com/questions/51803617/greyscale-image-to-3-channels> (Year: 2018).*

Training Neural Network with Zero Weight Initialization. Proceedings of the Cube International Information Technology Conference , ACM, 2012, pp. 235-239, https://doi.org/10.1145/2381716.2381761 (Year: 2012).*

Extended European Search Report issued on Jan. 11, 2021 in counterpart EP Patent Application No. 20186689.4 (6 pages in English).

Li, Weifu. "Design of Hardware Accelerators for Hierarchical Temporal Memory and Convolutional Neural Network." (2019) (103 pages in English).

Szeliski, Richard. "Computer Vision: Algorithms and Applications." Springer Science & Business Media, 2010 (979 pages in English).

"FPGA-Based CNN Inference Accelerator Synthesized from Multi-Threaded C Software", Kim, Jin Hee, et al. *2017 30th IEEE International System-on-Chip Conference* (*SOCC*). IEEE, 2017. (6 pages in English).

Chinese Office Action issued on Mar. 15, 2024, in counterpart Chinese Patent Application No. 202010576877.0 (10 pages in English, 12 pages in Chinese).

Yi, Ding "Design and Implementation of Multi-Channel Data Acquisition Device Based on FPGA" Thesis Submitted to Southwest University of Science and Technology for the Degree of Master, 2019, (Abstract in English, 78 pages in Chinese).

* cited by examiner

FIG. 3

INPUT FEATURE MAP (201)

KERNEL (202)

OUTPUT FEATURE MAP (203)

OUTPUT ACTIVATION

Figure 6:
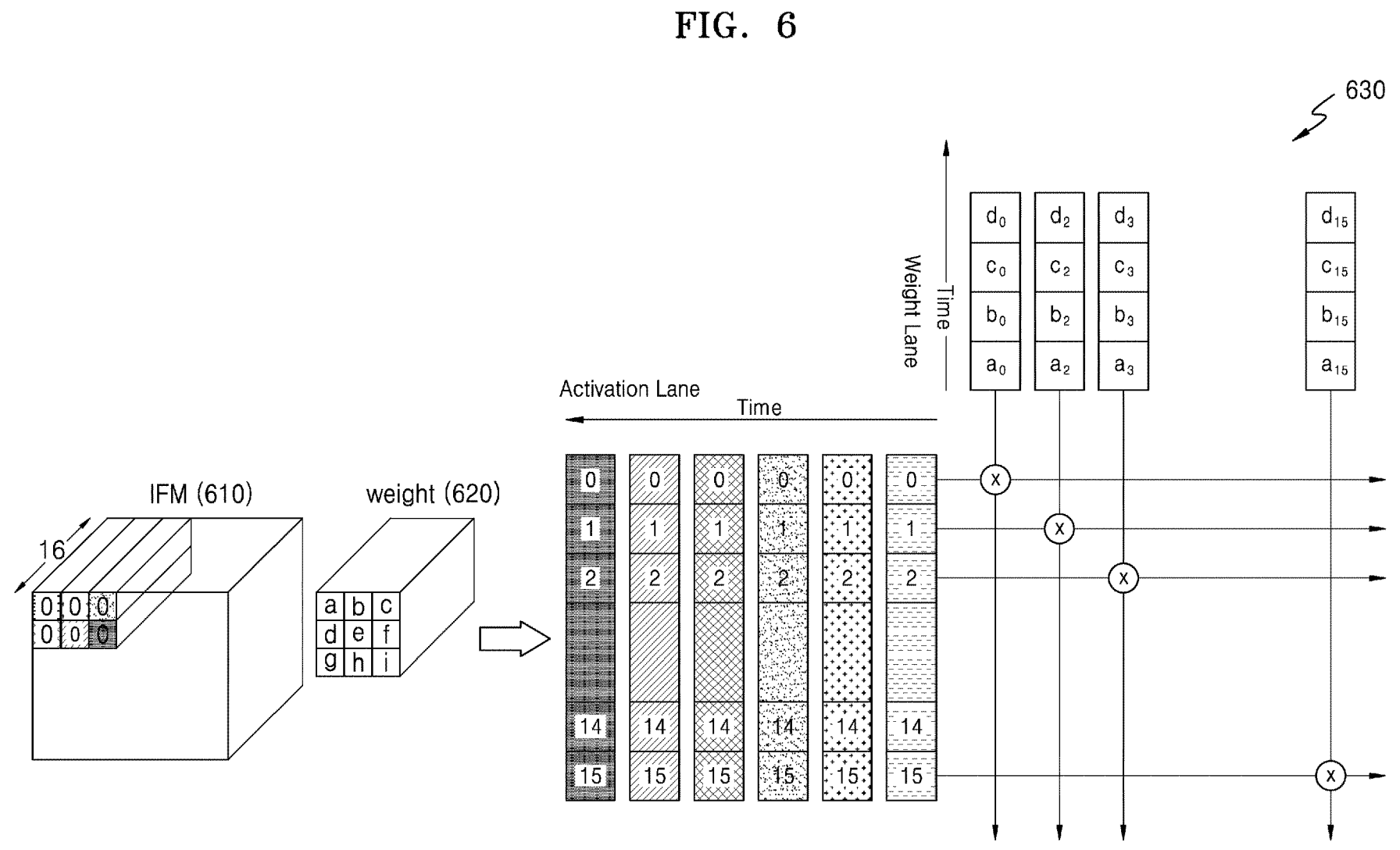

IFM (610)

16 weight (620)

Activation Lane

Time

Weight Lane

Time $a_0$ $b_0$ $c_0$ $d_0$ $a_2$ $b_2$ $c_2$ $d_2$ $a_3$ $b_3$ $c_3$ $d_3$ $a_{15}$ $b_{15}$ $c_{15}$ $d_{15}$ a b c d e f g h i 0 1 2 14 15

730
Weight Lane
Time
Activation Lane
Time
weight (720)
IFM (710)
731
16
3

1220
Time
Weight Lane
1211
Activation Lane
Time
shifter
1210
shift
col 0
col 1
col 2
col 3
col 4
col 5

METHOD AND APPARATUS WITH NETWORK INTEROPERABILITY PROCESSING

CROSS-REFERENCE TO RELATED APPLICATION

This application claims the benefit under 35 U.S.C. § 119 of Korean Patent Application No. 10-2019-0161677, filed on Dec. 6, 2019 in the Korean Intellectual Property Office, the entire disclosure of which is incorporated herein by reference for all purposes.

BACKGROUND

1. Field

The following description relates to methods and apparatuses for processing data.

2. Description of Related Art

A neural network refers to a computational architecture using the biological brain as a model. According to developments in neural network technology, input data is analyzed by using a neural network apparatus in various types of electronic systems and valid information is extracted.

A neural network apparatus performs a large number of operations with respect to input data. Studies have been conducted on technology capable of efficiently processing a neural network operation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects provide methods and apparatuses for processing data, and a computer-readable recording medium having recorded thereon a program for executing the methods on a computer.

In one general aspect, a method of processing data includes manipulating input data based on a configuration of the input data and a configuration of hardware for processing the input data to generate manipulated data, rearranging the manipulated data based on sparsity of the manipulated data to generate rearranged data, and processing the rearranged data to generate output data.

In another general aspect, a computer-readable recording medium includes a method of executing the above-described method by using a computer.

In another general aspect, an apparatus includes a memory in which at least one program is stored; and a processor that is configured to execute the at least one program to: manipulate input data based on a configuration of the input data and a configuration of hardware for processing the input data to generate manipulated data, rearrange the manipulated data based on sparsity of the manipulated data to generate rearranged data, and process the rearranged data to generate output data.

Manipulating the input data may include adding at least one channel configured by zeros to the input data based on the configuration of the hardware.

The input data may be manipulated based on a number of first channels included in the input data and a number of second channels included in the hardware.

The input data may be manipulated based on a value obtained by dividing the number of the second channels by the number of the first channels.

Manipulating the input data may include adding n channels, each being configured by zeros, between the first channels, and n may be a natural number less than or equal to the value obtained by dividing the number of the second channels by the number of the first channels.

Manipulating the input data may include shifting elements of one or more columns included in the input data according to a specified rule.

The specified rule may include shifting the elements of the one or more columns by a specified size in a same direction, and the specified rule may be applied periodically to the one or more columns.

Rearranging the manipulated data may include shifting at least one element included in the manipulated data from a first position of a first column including the at least one element to a second position of a second column.

The first position of the first column and the second position of the second column may correspond to each other.

The first position of the first column and the second position of the second column may be different from each other.

In another general aspect, an apparatus includes a memory and a processor configured to execute at least one program stored in the memory to: generate first data by manipulating input data based on a number of channels of an operator included in the processor; generate second data by rearranging the first data based on a validity of elements included in the first data; and perform a convolution operation on the second data to generate output data.

Generating the second data may include replacing at least one invalid element in the first data with a valid element.

The at least one invalid element may be a zero and the valid element may be a non-zero number.

Other features and aspects will be apparent from the following detailed description, the drawings, and the claims.

BRIEF DESCRIPTION OF THE DRAWINGS

FIGS. 2 and 3 are diagrams illustrating examples of a convolution operation of a neural network.

FIGS. 6 and 7 are diagrams illustrating examples of input data and an operator.

Figure 1:
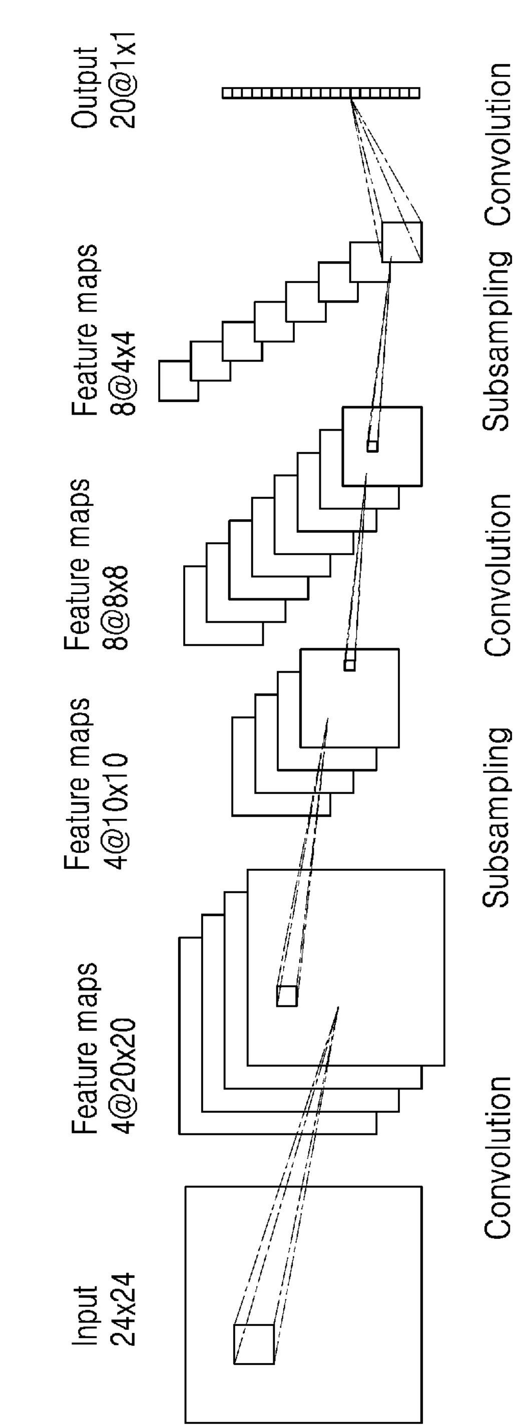
FIG. 1 is a diagram illustrating an architecture of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Hereinafter, examples will be described in detail with reference to the drawings.

FIG. 1 is a diagram illustrating an architecture of a neural network.

Referring to FIG. 1, a neural network 1 may be an architecture of a deep neural network (DNN) or n-layers neural networks. The DNN or n-layers neural networks may correspond to convolutional neural networks (CNN), recurrent neural networks (RNN), deep belief networks, restricted Boltzmann machines, and so on. For example, the neural network 1 may be implemented as the convolutional neural networks (CNN) but is not limited thereto. FIG. 1 illustrates some convolution layers in the convolutional neural network corresponding to an example of the neural network 1, but the convolutional neural network includes a pooling layer, a fully connected layer, and so on in addition to the illustrated convolution layer.

The neural network 1 may be implemented by an architecture with multiple layers including input images, feature maps, and outputs. In the neural network 1, the input image is subjected to a convolution operation with a filter called a kernel, and as a result, the feature maps are output. At this time, the generated output feature maps are subjected to a convolution operation with the kernel again as input feature maps, and new feature maps are output. As a result of this convolution operation being repeatedly performed, a recognition result for characteristics of the input image through the neural network 1 may be finally output.

For example, when an image with 24×24 pixel size is input to the neural network 1 of FIG. 1, the input image may be output as 4 channel feature maps with a 20×20 pixel size through a convolution operation with the kernel. Subsequently, the 20×20 feature maps are reduced in size through an iterative convolution operation with the kernel, and characteristics of 1×1 pixel size may be output. The neural network 1 may filter and output robust characteristics that may represent the entire image from the input image by repeatedly performing a convolution operation and a sub-sampling (or pooling) operation at various layers, and may derive a recognition result of the input image through the output final characteristics.

Figure 2:
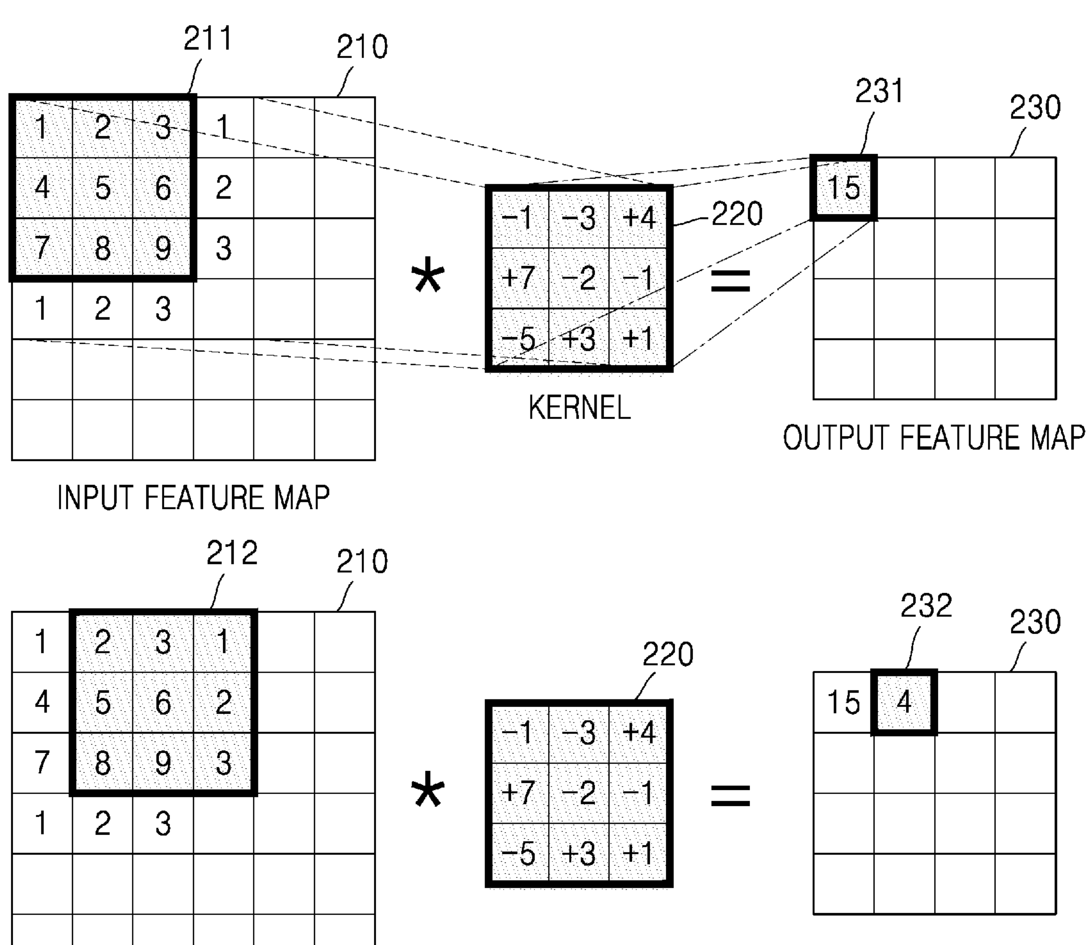
Figure 2:
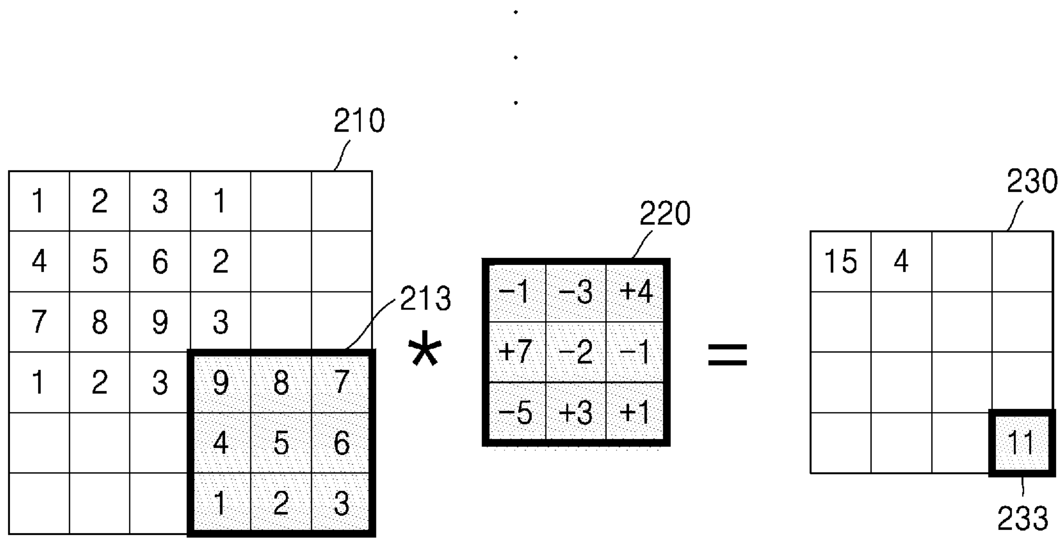
Figure 3:
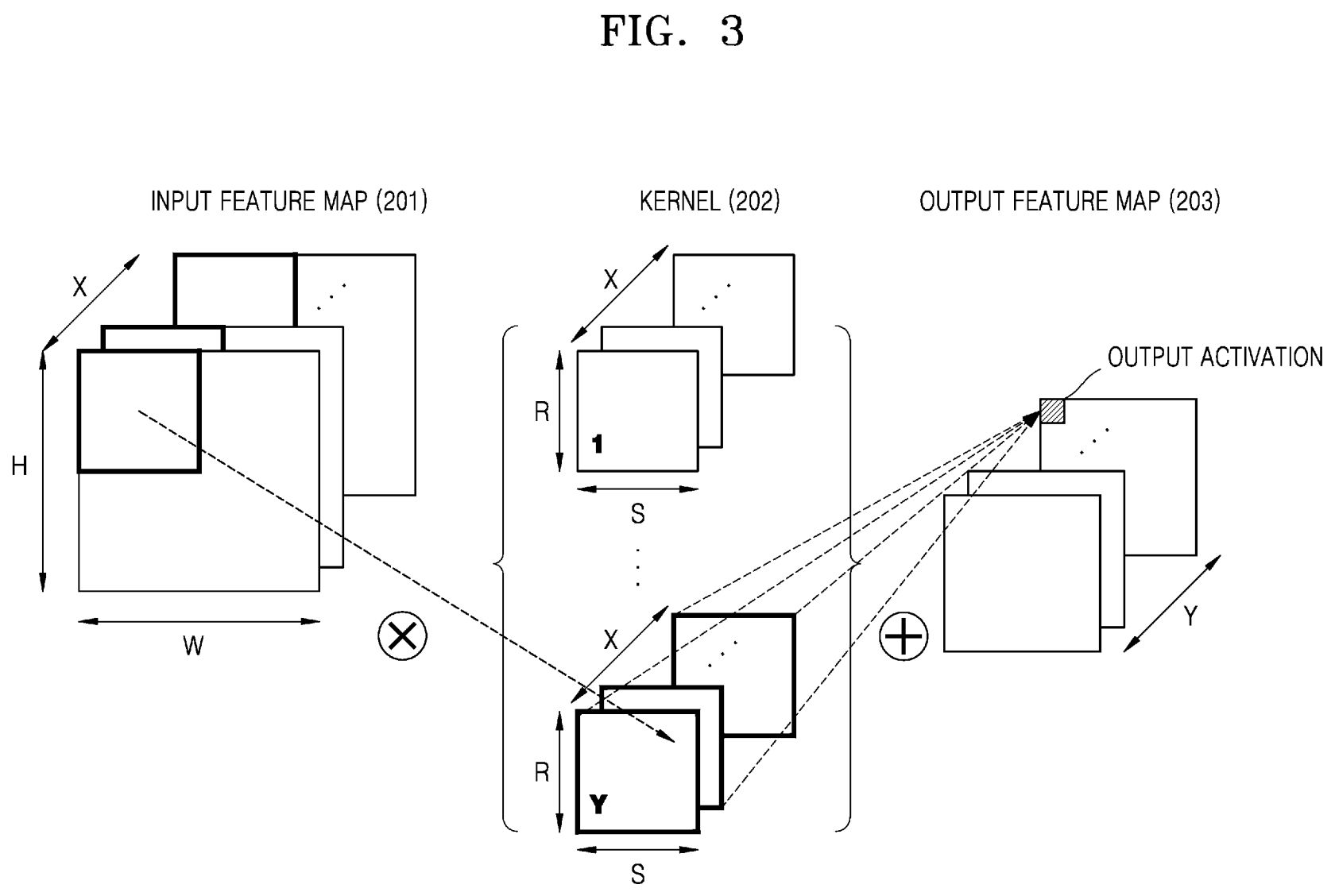

FIGS. 2 and 3 are diagrams illustrating examples of the convolution operation of the neural network.

Referring to FIG. 2, it is assumed that an input feature map 210 has a 6×6 pixel size, a kernel 220 has a 3×3 pixel size, and an output feature map 230 has a 4×4 pixel size, but the example is not limited thereto. The neural network may be implemented with feature maps and kernels of various sizes. In addition, values defined in the input feature map 210, the kernel 220, and the output feature map 230 are all exemplary values only, and the various examples are not limited thereto.

The kernel 220 performs a convolution operation while sliding in an area (or tile) unit with a 3×3 pixel size in the input feature map 210. The convolution operation is an operation in which multiplication is performed between each pixel value of a certain area of the input feature map 210 and a weight which is an element of the corresponding kernel 220 and values obtained by the multiplication are added together to obtain each pixel value of the output feature map 230.

First, the kernel 220 performs a convolution operation with a first area 211 of the input feature map 210. That is, pixel values 1, 2, 3, 4, 5, 6, 7, 8, and 9 of the first area 211 are multiplied by weights −1, −3, +4, +7, −2, −1, −5, +3, and +1, which are elements of the kernel 220, respectively, and as a result −1, −6, 12, 28, −10, −6, −35, 24, and 9 are obtained. Next, 15 is obtained by adding together the acquired values 1, −6, 12, 28, −10, −6, −35, 24, and 9, and a pixel value (231) of the first row and the first column of the output feature map 230 is determined to be 15. Here, the pixel value (231) of the first row and the first column of the output feature map 230 correspond to the first area 211.

In the same manner as described above, by performing a convolution operation between the second area 212 of the input feature map 210 and the kernel 220, a pixel value (232) of the first row and the second column of the output feature map 230 is determined. Finally, by performing the convolution operation between the sixteenth area 213, which is the last window of the input feature map 210, and the kernel 220, 11, which is a pixel value (233) of the fourth row and the four column of the output feature map 230, is determined.

Although FIG. 2 illustrates a two-dimensional convolution operation, the convolution operation may correspond to a three-dimensional convolution operation in which input feature maps, kernels, and output feature maps of a plurality of channels exist. This will be described with reference to FIG. 3.

Referring to FIG. 3, the input feature map 201 may have a three-dimensional size, X input channels may exist, and the two-dimensional input feature map of each input channel may have a size of H rows and W columns (X, W, and H are natural numbers). The kernel 202 may have a four-dimensional size, and a two-dimensional kernel having a size of R row and S columns may exist as many as X input channels and Y output channels (R, S, and Y are natural numbers). In other words, the kernel 202 may have the number of channels corresponding to the number of input channels X of the input feature map 201 and the number of output channels Y of the output feature map 203, and the two-dimension kernel of each channel may have a size of R rows and S columns. The output feature map 203 may be generated through a three-dimensional convolution operation between the three-dimensional input feature map 201 and the four-dimensional kernel 202, and there may be Y channels according to the three-dimensional convolution operation result.

A process of generating an output feature map through a convolution operation between one two-dimensional input feature map and one two-dimensional kernel is the same as described above with reference to FIG. 2, and by repeatedly performing the two-dimensional convolution operation, which is described with reference to FIG. 2, between the input feature map 201 of the X input channels and the kernel 202 of the X input channels and the Y output channels, the output feature map 203 of the Y output channels may be generated.

Figure 4:
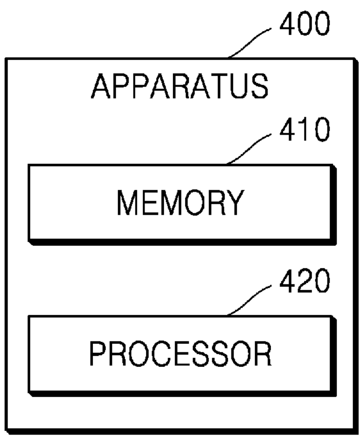
FIG. 4 is a configuration diagram illustrating an example of an apparatus for processing data.

FIG. 4 is a configuration diagram illustrating an example of an apparatus for processing data.

Referring to FIG. 4, an apparatus 400 for processing data includes a memory 410 and a processor 420. Although not illustrated in FIG. 4, the apparatus 400 for processing data may be connected to an external memory. The apparatus 400 of FIG. 4 includes only configuration elements relating to the present example. Accordingly, other general-purpose configuration elements may be further included in the apparatus 400 in addition to the configuration elements illustrated in FIG. 4.

The apparatus 400 may be an apparatus in which the neural network described above with reference to FIGS. 1 to 3 is implemented. For example, the apparatus 400 may be implemented with various kinds of devices such as a personal computer (PC), a server device, a mobile device, and an embedded device. As a detailed example, the apparatus 400 for processing data may be included in a smartphone, a tablet device, an augmented reality (AR) device, an internet of things (IoT) device, autonomous driving automobile, robotics, a medical instrument, and so on, which perform voice recognition, image recognition, image classification, and so on, by using a neural network, but is not limited thereto. In addition, the apparatus 400 may correspond to a dedicated hardware accelerator (HW accelerator) mounted in the above-described device, and may be a hardware accelerator such as a neural processing unit (NPU), a tensor processing unit (TPU), a neural engine, which are dedicated modules for driving a neural network.

The memory 410 stores various data processed by the apparatus 400. For example, the memory 410 may store the data processed by the apparatus 400 and data to be processed by the apparatus 400. In addition, the memory 410 may store applications to be driven by the apparatus 400, drivers, and so on.

For example, the memory 410 may include a random access memory (RAM), such as a dynamic random access memory (DRAM) or a static random access memory (SRAM), a read-only memory (ROM), an electrically erasable programmable read-only memory (EEPROM), a CD-ROM, Blu-ray or an optical disk storage, a hard disk drive (HDD), a solid state drive (SSD), or a flash memory.

The processor 420 controls overall functions for driving the neural network in the apparatus 400. For example, the processor 420 generally controls the apparatus 400 by executing a program stored in the memory 410. The processor 420 may be implemented as a central processing unit (CPU), a graphics processing unit (GPU), an application processor (AP), or the like provided in the apparatus 400 but is not limited thereto.

The processor 420 reads and writes data (for example, image data, feature map data, kernel data, and so on) from the memory 410 and implements a neural network by using read or written data. When the neural network is implemented, the processor 420 drives processing units included therein to repeatedly perform a convolution operation between the kernel and the input feature map for generating data relating to the output feature map. At this time, the number of the convolution operations may be determined depending on various factors such as the number of channels of the input feature map, the number of channels of the kernel, a size of the input feature map, a size of the kernel, and a precision of the value.

For example, the processing unit may include a logic circuit for the convolution operation. The processing unit may include an operator implemented by a combination of a multiplier, an adder, and an accumulator. In addition, the multiplier may be implemented by a combination of a plurality of sub-multipliers, and the adder may also be implemented by a combination of a plurality of sub-adders.

The processor 420 may further include an on-chip memory that performs a cache function to process the convolution operation, and a dispatcher for dispatching various operands such as pixel values of an input feature map or weight values of kernels. For example, the dispatcher may dispatch operands such as pixel values and weight values required for an operation to be performed by a processing unit from data stored in the memory 410 to the on-chip memory. The dispatcher then dispatches the operands dispatched in the on-chip memory back to the processing unit for the convolution operation.

Performance of the apparatus 400 depends on input data and a hardware configuration of the apparatus 400. For example, when the number of channels of the operator included in the processor 420 is N (N is a natural number), and the number of channels of the input data (input feature map data and kernel data) is not a multiple of N, the performance of the apparatus 400 may be degraded. When the number of channels of the input data is smaller than the number of channels of the operator, there are idle channels in the operator. Accordingly, the apparatus 400 may not operate with the highest performance.

The apparatus 400 identifies the input data and the configuration of hardware for processing the input data. The apparatus 400 then manipulates the input data based on the identifying result. Here, manipulating the input data means adding at least one channel to the input data. Accordingly, the apparatus 400 may process data without the idle channel in the operator.

In addition, the apparatus 400 rearranges the manipulated data based on sparsity of the manipulated data. Here, rearranging the manipulated data means processing of changing an initial configuration of a data matrix, such as changing positions of some elements included in the data matrix, or skipping some rows or some columns included in the data matrix. Accordingly, the apparatus 400 may output a valid result without performing an unnecessary operation, and thus, the total number of operations may be reduced while a desirable result is output.

An example in which the apparatus 400 manipulates input data, rearranges the manipulated data, and processes the rearranged data to generate output data will be described with reference to FIGS. 5 through 14.

Figure 5:
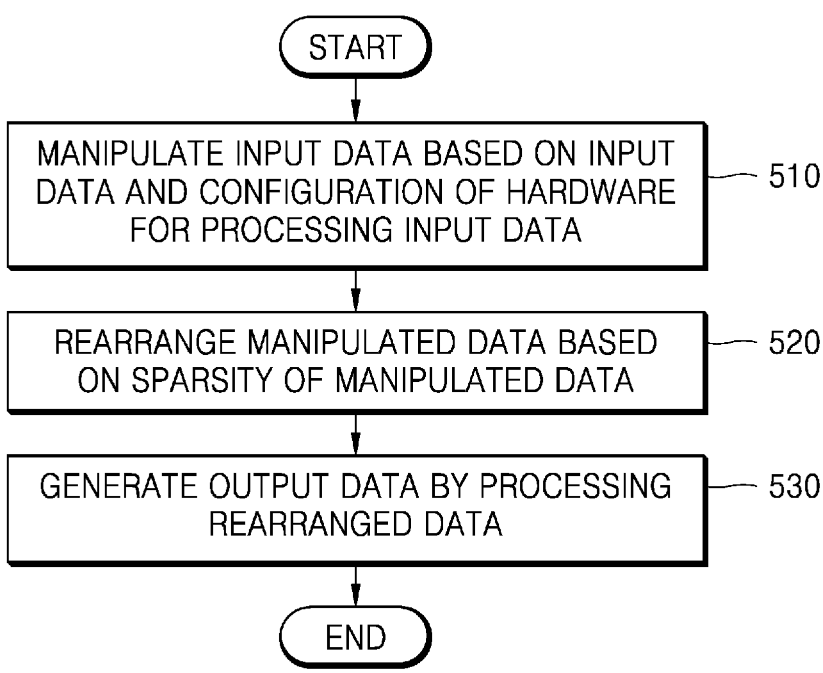
FIG. 5 is a flowchart illustrating an example of a method of processing data.

FIG. 5 is a flowchart illustrating an example of a method of processing data.

Referring to FIG. 5, the method of processing data is configured with steps processed in time series by the apparatus 400 illustrated in FIG. 4. Accordingly, it may be seen that, although omitted below, the above description on the apparatus 400 illustrated in FIG. 4 is also applied to the method of processing data illustrated in FIG. 5.

In operation 510, the processor 420 manipulates input data based on the input data and a configuration of hardware for processing the input data.

The input data means a target for which the processor 420 performs a convolution operation. For example, the input data may include image data, feature map data, or kernel data. At this time, the feature map data may be input feature map data or output feature map data. The processor 420 performs a convolution operation in the plurality of layers, and the output feature map data in the previous layer becomes the input feature map data in the next layer. Accordingly, the input data of operation 510 may be the input feature map data or the output feature map data. As described above with reference to FIG. 4, the input data may be a matrix in which data are included as elements.

The processor 420 manipulates the input data based on the input data and the configuration of hardware. Here, the configuration of hardware means the number of channels of the operator included in the processor 420.

For example, the processor 420 may identify the input data and a configuration of the operator and compare the number of channels of the input data with the number of channels of the operator. The processor 420 may add at least one channel of zeros configured by zeros to the input data based on the comparison result. At this time, the number of channels added to the input data is determined depending on the number of channels of the operator. For example, the processor 420 may add at least one channel to the input data such that no idle channel exists in the operator.

Hereinafter, an example in which the processor 420 identifies the input data and the configuration of hardware will be described with reference to FIGS. 6 and 7. Next, an example in which the processor 420 manipulates input data will be described with reference to FIG. 8.

Figure 7:
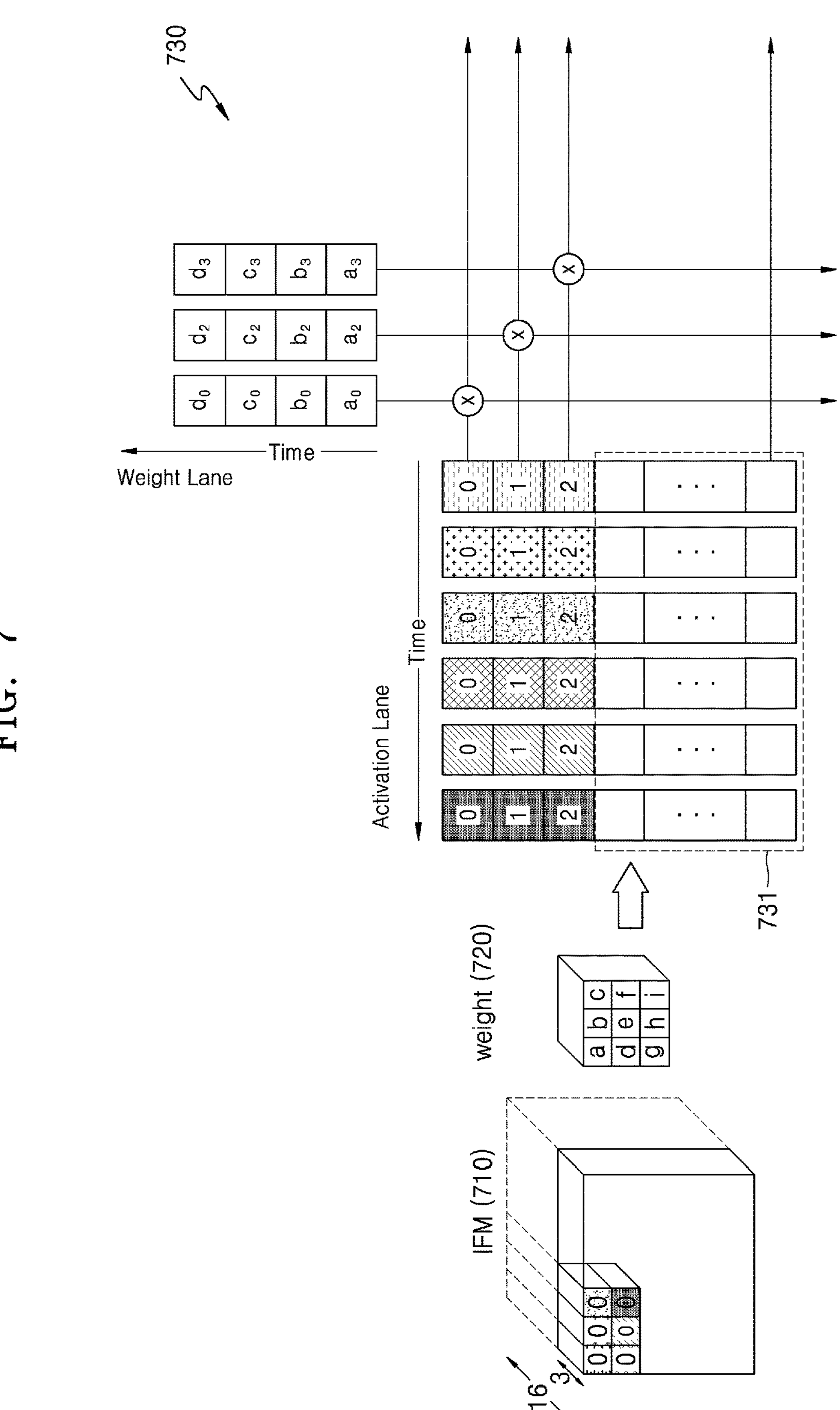

FIGS. 6 and 7 diagrams illustrating examples of the input data and the operator.

FIGS. 6 and 7 illustrate examples of the input feature map data 610 and 710 and the kernel data 620 and 720 as input data. FIGS. 6 and 7 illustrate examples of operators 630 and 730 that perform an operation between the input data.

In FIGS. 6 and 7, the operators 630 and 730 are illustrated as including 16 channels but are not limited thereto. That is, the number of channels included in the operators 630 and 730 may change depending on specifications of the apparatus 400 for processing data.

Referring to FIG. 6, the input feature map data 610 has a three-dimensional size, and 16 input channels exist therein. In addition, the two-dimensional data of each input channel has a size of two rows and three columns. In addition, the kernel data (weight) 620 has the number of channels corresponding to the number (sixteen) of input channels of the input feature map data 610.

The input feature map data 610 and the kernel data 620 are input to the operator 630, and a convolution operation is performed therefor. At this time, since the number of channels of the input feature map data 610 and the number of channels of the operator 630 are the same, there is no idle channel in the operator 630. Accordingly, the operator 630 may operate at the highest efficiency.

Referring to FIG. 7, three input channels exist in the input feature map data 710. In addition, the kernel data (weight) 720 has the number of channels corresponding to the number (three) of input channels of the input feature map data 710.

Since the operator 730 includes sixteen channels, thirteen idle channels 731 are generated when the input feature map data 710 is input to the operator 730. Accordingly, the operator 730 may not operate at the highest efficiency.

In this case, the processor 420 may add channels to the input feature map data 710. For example, the processor 420 may set the number of channels of the input feature map data 710 to be the same as the number of channels of the operator 730 by adding the thirteen channels to the input feature map data 710.

In addition, the processor 420 may set the number of channels of the input feature map data 710 to M times the number of channels of the operator 730 (M is a natural number) by adding the channels to the input feature map data 710. For example, as illustrated in FIG. 7, the processor 420 may set the number of channels of the input feature map data 710 to 16, 32, and so on by adding the channels to the input feature map data 710.

Accordingly, the operator 730 may perform an operation by using all channels, and thus, an operation efficiency of the operator 730 may be increased. In other words, the processor 420 may manipulate the input feature map data 710 such that idle channels are not generated in the operator 730.

Figure 8:
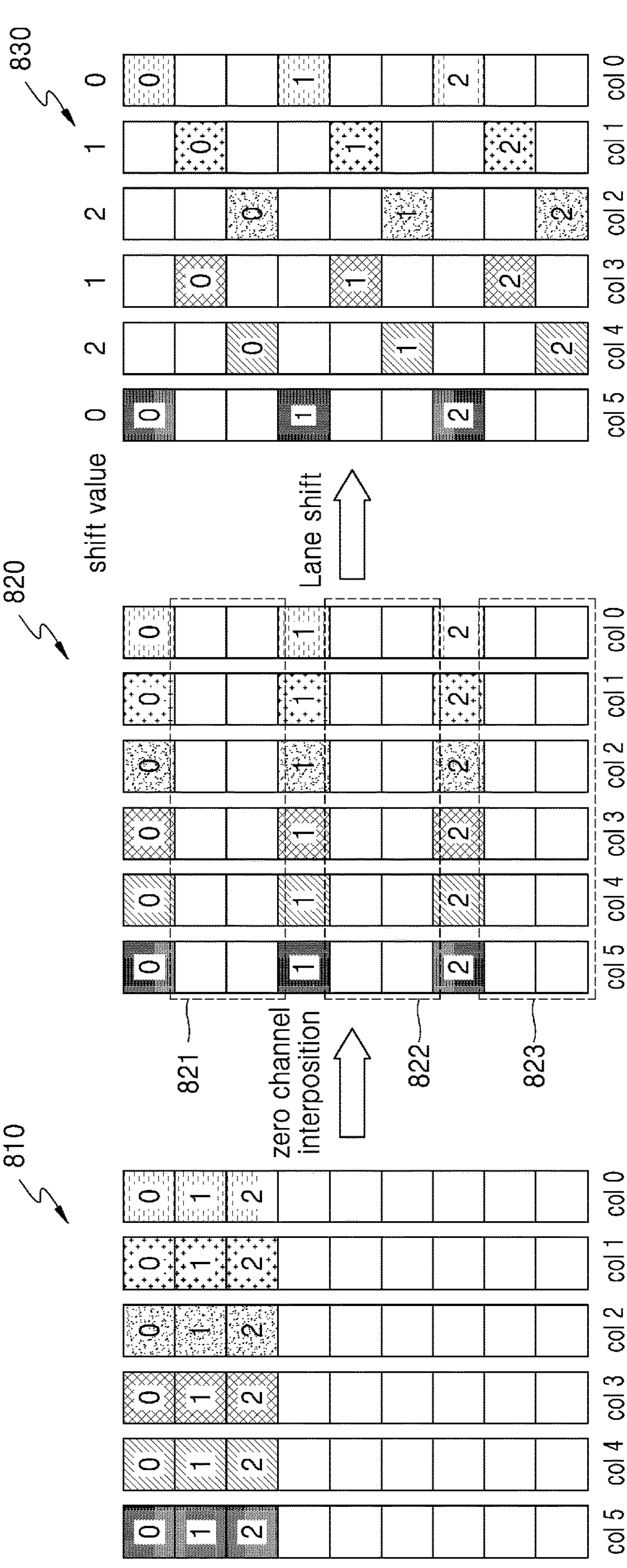
FIG. 8 is a diagram illustrating an example in which a processor manipulates input data.

FIG. 8 is a diagram illustrating an example in which a processor manipulates input data.

FIG. 8 illustrates input data 810 and manipulated data 820 and 830. Here, the input data 810 may be input feature map data but is not limited thereto. The processor 420 manipulates input data 810 to generate the first manipulated data 820 and manipulates the first manipulated data 820 to generate the second manipulated data 830.

Numbers “0”, “1”, and 2” displayed on the input data 810 are only channel numbers of the input data 810, and the numbers themselves do not mean information indicated by the data. In other words, the number “0” is elements included in the first channel of the input data 810, the number “1” is elements included in the second channel of the input data 810, and the number “2” is elements included in the third channel of the input data 810. The respective elements may represent unique information.

The processor 420 manipulates the input data 810 to generate the first manipulated data 820. For example, the processor 420 may generate the first manipulated data 820 by adding at least one channel 821, 822, 823 to the input data 810. Here, the at least one channel 821, 822, 823 to be added may be configured by zeros.

The processor 420 may manipulate the input data 810 based on the number of first channels included in the input data and the number of second channels included in hardware. Here, the hardware means the number of channels of an operator included in the processor 420. For example, the processor 420 may determine the number of channels 821, 822, and 823 added according to Equation 1 below.

$$N_{channel} = \frac{N_{lane}}{N_{input}} - 1 \quad \text{Equation 1}$$

In Equation 1, $N_{channel}$ refers to the largest value of the number of lanes included in each of the channels 821, 822, and 823, $N_{lane}$ refers to the number of channels of the operator, and $N_{input}$ refers to the number of channels of the input data 810.

For example, it is assumed that the input data 810 includes three channels, and an operator that processes the input data 810 includes nine channels. In this case, the processor 420 identifies $N_{channel}$ as 2 according to Equation 1. The processor 420 generates the first manipulated data 820 by adding up to two lanes between the channels of the input data 810. Here, the added lanes may be configured by zeros.

Although FIG. 8 illustrates that the channels 821, 822, and 823 are configured by two lanes, the channels are not limited thereto. According to the example described above, each of the channels 821, 822, and 823 may include one or two lanes, respectively.

The processor 420 manipulates the first manipulated data 820 to generate the second manipulated data 830. For example, the processor 420 may shift elements of each of the plurality of columns included in the first manipulated data 820 according to a specified rule. Here, the specified rule means a rule for moving elements of each of the plurality of columns by a specified size in the same direction. In addition, the specified rule may be periodically applied to the plurality of columns.

Referring to FIG. 8, the processor 420 may shift elements of each of columns col 0-5 included in the first manipulated data 820 according to a specified rule. The specified rule may be a rule for shifting elements of each of the plurality of columns col 0-5 by a specified size in the same direction. Here, the specified size may be adaptively changed by the processor 420 according to a form of sparsity of the first manipulated data 820, and a size of the shifting to be applied to each of the plurality of columns col 0-5 may all be changed. For example, the processor 420 may generate the second column col 1 of the second manipulated data 830 by shifting activations included in the second column col 1 of the first manipulated data 820 by one row. In addition, the processor 420 may generate the fifth column col 4 of the second manipulated data 830 by shifting activations included in the fifth column col 4 of the first manipulated data 820 by two rows. In addition, the processor 420 may shift or may not shift activations of other columns col 0, 2, 3, 5 of the first manipulated data 820, according to the form of the sparsity of the first manipulated data 820, In addition, the specified rule may be periodically applied to the plurality of columns col 0-5. As illustrated in FIG. 8, the processor 420 may periodically apply a shift rule of “0-1-2-1-2-0” to the next data of the first manipulated data 820. For example, a cycle may be the same as a size of kernel data but is not limited thereto.

Referring back to FIG. 5, in operation 520, the processor 420 rearranges the manipulated data based on the sparsity of the manipulated data.

The sparsity means presence or absence of a blank of the data or a state of the data included in the blank. For example, valid information may be represented by a nonzero number. Here, the valid information means data with which a meaningful convolution operation may be performed. In general, information may be represented by numbers, and thus, the valid information may mean data that is a non-zero number. In other words, meaningless information may represent data as zero.

Accordingly, the data represented as zero means meaningless information, which may also be construed as blank data (that is, no data). Accordingly, that the processor 420 identifies sparsity of the manipulated data is the same as that the processor 420 identifies distribution of zeros in the manipulated data.

The processor 420 may rearrange the manipulated data in various manners. For example, the processor 420 may shift at least one element included in the manipulated data from a first position of the first column to a second position of the second column. Here, the first column means a column located before the element is shifted, and the second column means a column located after the element shifted. At this time, the first position of the first column and the second position of the second column may be positions corresponding to each other or may be different positions.

In operation 530, the processor 420 processes the rearranged data to generate output data. For example, the processor 420 may generate the output data by performing a convolution operation by using the rearranged data. An example in which the processor 420 performs the convolution operation is as described above with reference to FIG. 2.

Hereinafter, examples in which the processor 420 rearranges the manipulated data will be described with reference to FIGS. 9A through 14.

Figure 9A:
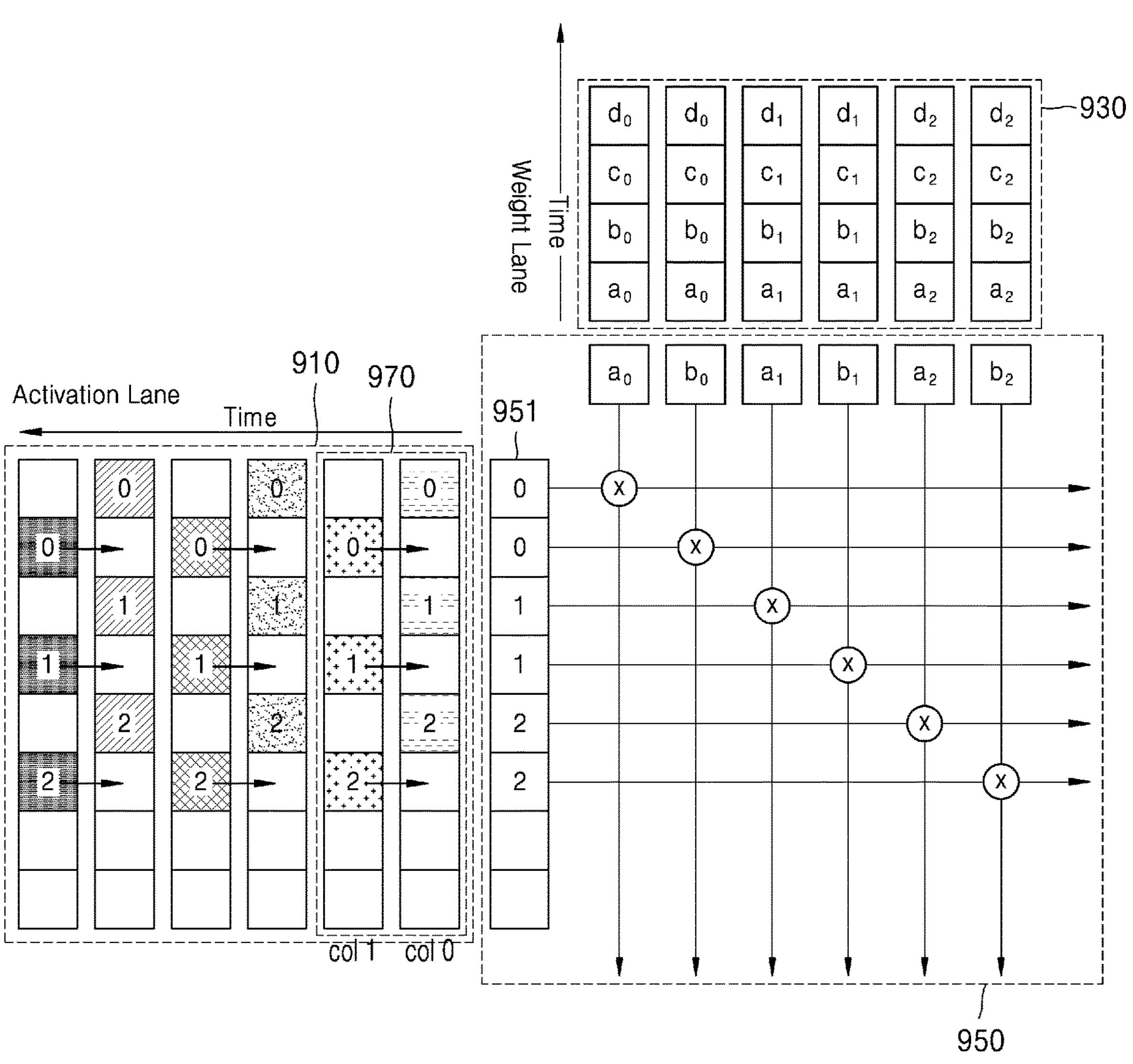
FIGS. 9A and 9B are diagrams illustrating an example in which a processor rearranges manipulated data.
Figure 9B:
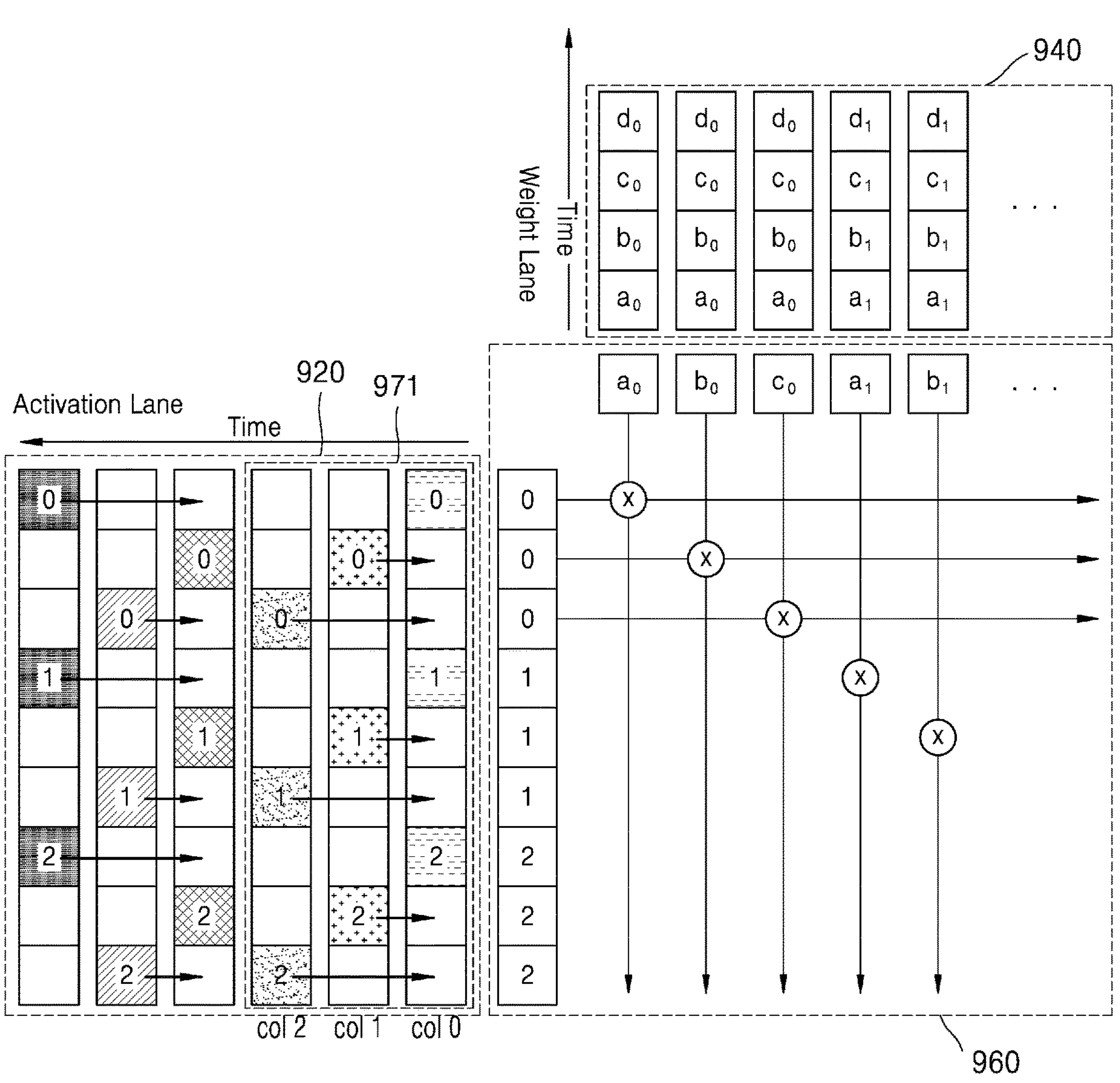

FIGS. 9A and 9B are diagrams illustrating an example in which the processor rearranges the manipulated data.

FIGS. 9A and 9B illustrate manipulated data 910 and 920 and kernel data 930 ad 940. If the manipulated data 910 and 920 are rearranged, the kernel data 930 and 940 may also be rearranged to correspond to the rearranged data.

For example, the processor 420 rearranges the kernel data 930 and 940 such that weights corresponding to activations input to operators 950 and 960 are input to the operators 950 and 960. The processor 420 then inputs the weights into the operators 950 and 960 according to the rearranged kernel data 930 and 940. Accordingly, accurate operation results may be output from the operators 950 and 960 even with the rearranged data.

Referring to FIG. 9A, the processor 420 inputs some of the manipulated data 910 to the operator 950. For example, the processor 420 may input activations included in a window 970 among the manipulated data 910 to the operator 950. At this time, the processor 420 may apply a specified rule to the activations included in the window 970 to input the largest activations to the operator 950.

The processor 420 may shift at least one element included in the window 970 from a first position of the first column to a second position of the second column. Here, the first position and the second position may be positions corresponding to each other. For example, the processor 420 may identify blanks in the columns col 0 and col 1 in the window 970 and assign the activations of the column col 1 to a blank of the column col 0. Referring to FIG. 9A, it may be seen that activations 0, 1, and 2 of the column col 1 are shifted to the same position of the column col 0.

The processor 420 inputs the rearranged data (activations) to an input layer 951 of the operator 950 according to the manner described above. When comparing the column col 0 of the manipulated data 910 with the input layer 951, the number of blanks of the input layer 951 is smaller than the number of blanks of the column col 0. It means that a blank includes data 0, and thus, an output is zero, regardless of what value the weight corresponding to the blank has. Accordingly, the larger the number of blanks included in the input layer 951 (that is, the larger the number of zeros included in the input layer 951), the greater the number of unnecessary operations.

Referring to FIG. 9B, a size of the window 971 is larger than a size of the window 970. In other words, the processor 420 may set various sizes of the windows 970 and 971. For example, the processor 420 may set the sizes of the windows 970 and 971 to correspond to the number of times of manipulating the input data but is not limited thereto. When comparing FIG. 9A with FIG. 9B, the sizes of the windows 970 and 971 are different, and manners in which the manipulated data 910 and 920 are rearranged are the same.

Figure 10:
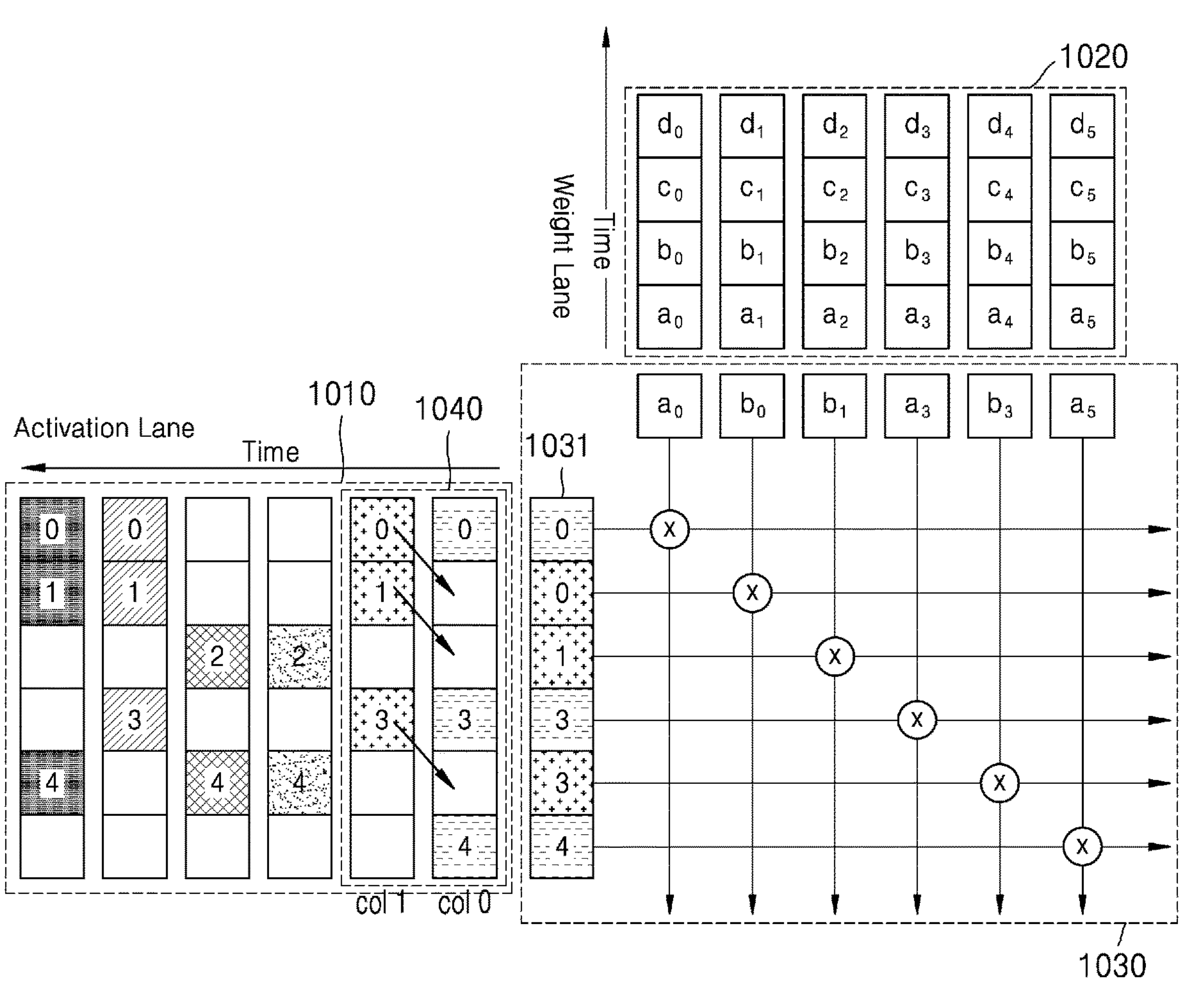
FIG. 10 is a diagram illustrating another example in which a processor rearranges manipulated data.

FIG. 10 is a diagram illustrating another example in which a processor rearranges manipulated data.

FIG. 10 illustrates manipulated data 1010 and kernel data 1020. If the manipulated data 1010 is rearranged, the kernel data 1020 may also be rearranged to correspond to the rearranged data, as described above with reference to FIGS. 9A and 9B.

The processor 420 inputs some of the manipulated data 1010 to the operator 1030. For example, the processor 420 may input activations included in the window 1040 of the manipulated data 1010 to the operator 1030.

The processor 420 may shift at least one element included in the window 1040 from a first position of the first column to a second position of the second column. Here, the first position and the second position may be different from each other. For example, the processor 420 may identify blanks of the columns col 0 and col 1 in the window 1040 and may assign the activations of the column col 1 to the blank of the column col 0. Referring to FIG. 10, it may be seen that activations 0, 1, and 3 of the column col 1 are shifted to a transverse position of the column col 0.

In the manner described above, the processor 420 inputs the rearranged activations to an input layer 1031 of the operator 1030. When comparing the column col 0 of the window 1040 with the input layer 1031, there is a blank in the column col 0, and there is no blank in the input layer 1031. Accordingly, the processor 420 may minimize the number of unnecessary operations performed by the operator 1030.

As described above with reference to FIGS. 9A through 10, the processor 420 is illustrated as rearranging data by separately applying the method of FIGS. 9A and 9B or the method of FIG. 10 but is not limited thereto. The processor 420 may identify sparsity of the manipulated data 910, 920, and 1010 or the kernel data 930, 940, and 1020, and adaptively apply at least one of the methods of FIGS. 9A and 9B and FIG. 10 to the manipulated data 910, 920, and 1010 and/or the kernel data 930, 940, and 1020.

Figure 11:
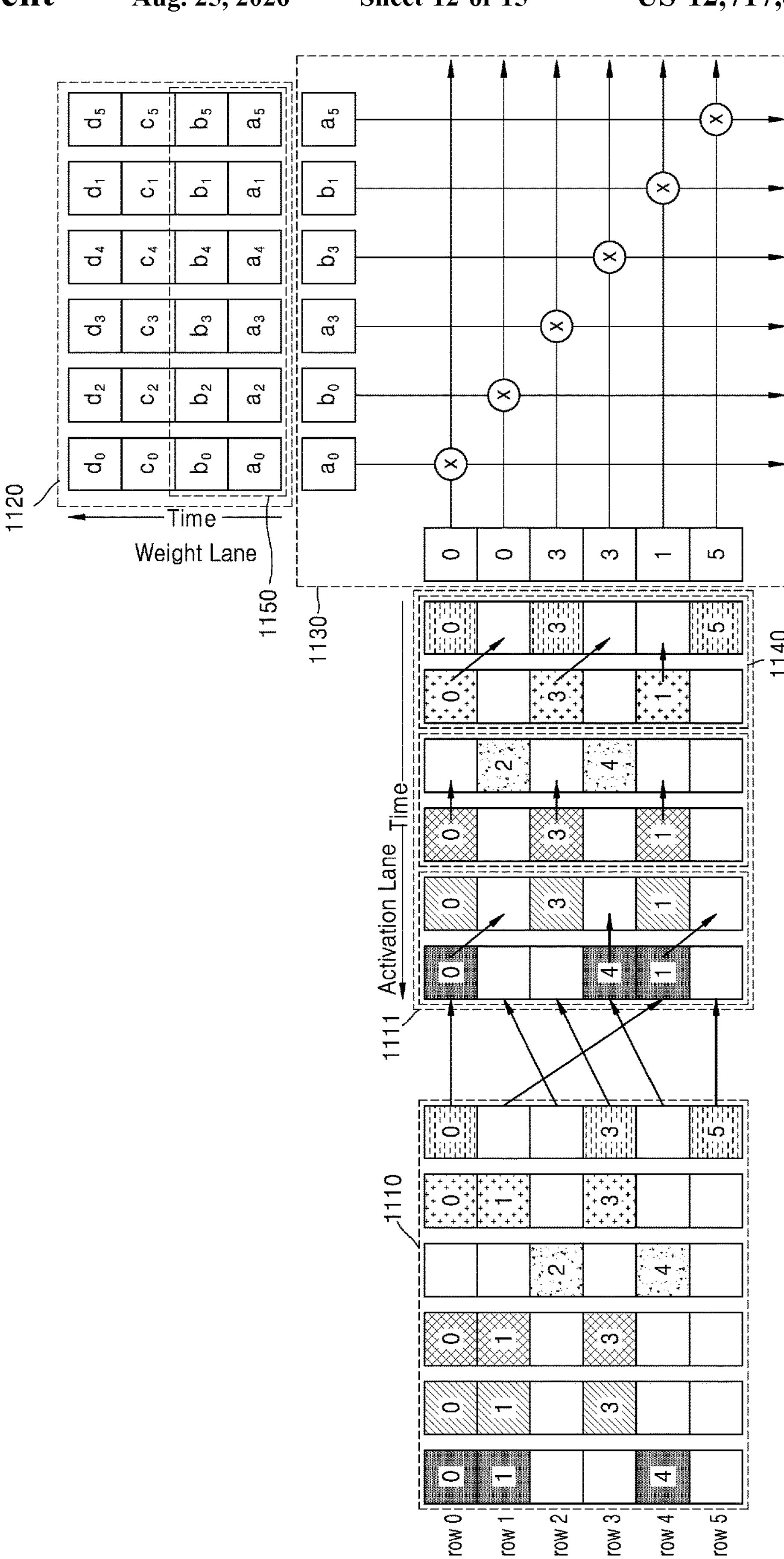
FIG. 11 is a diagram illustrating another example in which a processor rearranges manipulated data.

FIG. 11 is a diagram illustrating another example in which the processor rearranges manipulated data.

FIG. 11 illustrates manipulated data 1110 and kernel data 1120. Some of the manipulated data 1110 includes blanks. Here, the blank may be interpreted as having no valid information, for example, an activation corresponding to the blank may be zero. In addition, in FIG. 11, a blank is included only in the manipulated data 1110 but is not limited thereto. In other words, 0 may also be included in at least one of weights included in the kernel data 1120.

The processor 420 may rearrange the manipulated data 1110 based on a form of sparsity of the manipulated data 1110. For example, the processor 420 may rearrange a plurality of rows row 0 to row 5 based on the number of zeros (that is, the number of blanks) included in each of the plurality of rows row 0 to row 5 included in the manipulated data 1110

For example, referring to the manipulated data 1110 and rearranged data 1111, the processor 420 may arrange the row row 2 including the most zeros and the row row 0 including the least zeros to be adjacent, among the plurality of rows row 0 to row 5 of the manipulated data 1110. In a similar manner, the processor 420 may arrange the row row 5 including the most zeros (same number as the row row 2) and the row row 1 including the least zeros (same number as the row row 0) to be adjacent. In addition, the processor 420 may arrange the row row 4 including the second most zeros and the row row 3 including the second least zeros to be adjacent, among the plurality of rows row 0 to row 5 of the manipulated data 1110. In this manner, the processor 420 may generate rearranged data 1111 by rearranging the plurality of rows row 0 to row 5 of the manipulated data 1110 based on the number (that is, the number of blanks) including zeros.

In addition, the processor 420 may rearrange activations included in a window 1140 among the rearranged data 1111 according to the method described above with reference to FIGS. 9A through 10 and may input the rearranged activations into the operator 1130. In addition, the processor 420 may also apply a window 1150 having the same size to the kernel data 1120 to rearrange the weights included in the window 1150 and input the rearranged weights to the operator 1130.

Figure 12:
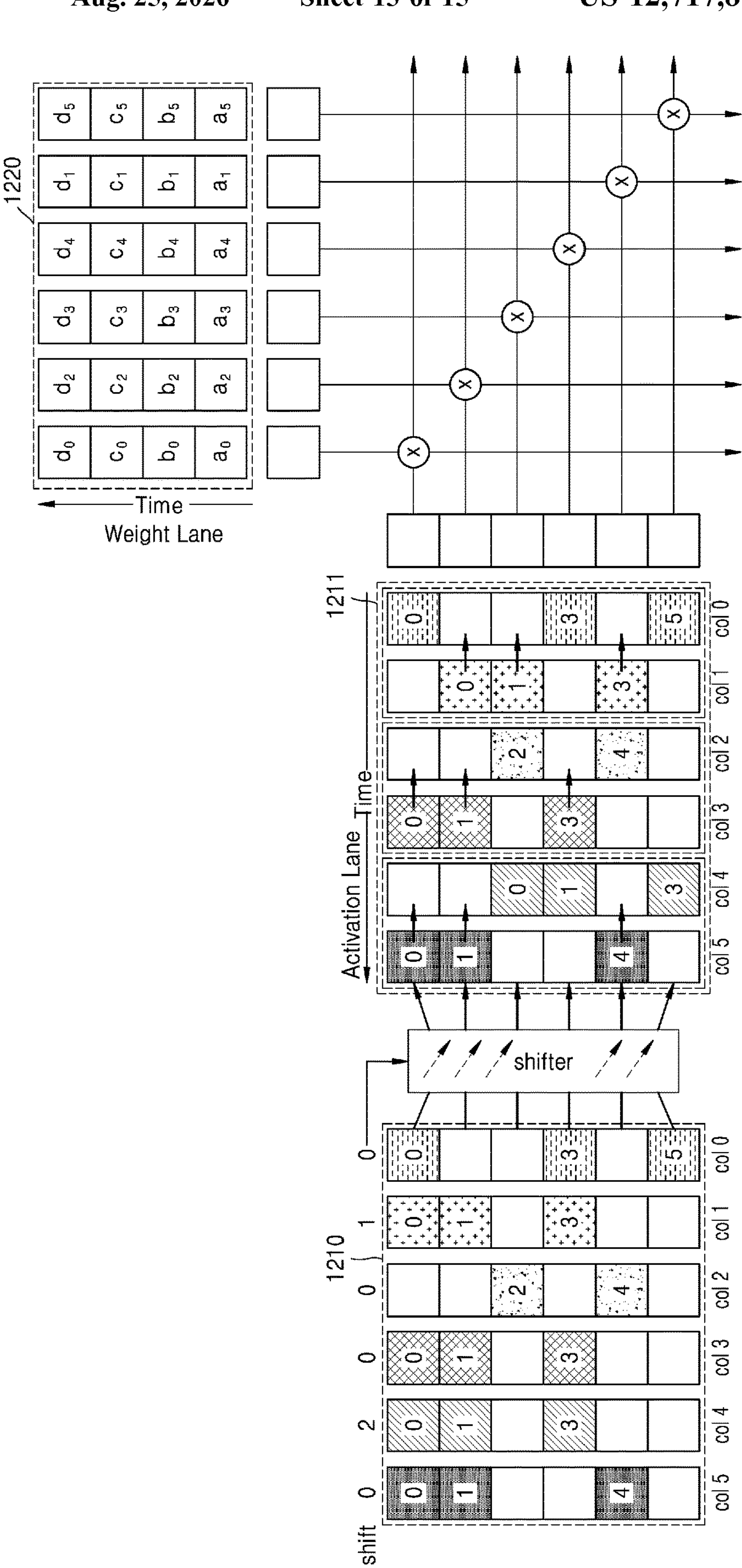
FIG. 12 is a diagram illustrating another example in which a processor rearranges manipulated data.

FIG. 12 is a diagram illustrating another example in which a processor rearranges manipulated data.

FIG. 12 illustrates manipulated data 1210 and kernel data 1220. Some of the manipulated data 1210 includes blanks. In addition, the blanks are illustrated as being included only in the manipulated data 1210 in FIG. 12 but is not limited thereto. In other words, 0 may also be included in at least one of the weights included in the kernel data 1220.

The processor 420 may rearrange the manipulated data 1210 based on a form of sparsity of the manipulated data 1210. For example, the processor 420 may shift elements of each of the plurality of columns col 0 to col 5 included in the manipulated data 1210 according to the following method.

For example, the processor 420 may shift elements of each of the plurality of columns col 0 to col 5 by a specified size in the same direction. Here, the specified size may be adaptively changed by the processor 420 according to the form of sparsity of the manipulated data 1210, and a shift size to be applied to each of the plurality of columns col 0 to col 5 may be different from each other. For example, referring to the manipulated data 1210 and the rearranged data 1211, the processor 420 may generate the second column col 1 of the rearranged data 1211 by shifting activations included in the second column col 1 of the manipulated data 1210 by one space (for example, down one space). In addition, the processor 420 may generate the fifth column col 4 of the rearranged data 1211 by shifting activations included in the fifth column col 4 of the manipulated data 1210 by two spaces (for example, down two spaces). In addition, the processor 420 may not shift activations for other columns col 0, col 2, col 3, and col 5 of the manipulated data 1210, depending on the form of sparsity of the manipulated data 1210.

In addition, the method described above may be periodically applied to the plurality of columns col 0 to col 5. As illustrated in FIG. 12, the processor 420 may periodically apply a shift rule of "0-1-0-0-2-0" to data to be input subsequent to the manipulated data 1210. For example, a cycle may be the same as a size of the kernel data 1220 but is not limited thereto. Through this process, the processor 420 may prevent an unnecessary convolution operation from being performed.

In addition, the processor 420 also rearranges the kernel data 1220 to correspond to the rearranged data 1211. For example, the processor 420 rearranges the kernel data 1220 so that weights to be operated with the activations input to the operator are correctly input to the operator. In addition, the processor 420 inputs the weights to the operator according to the rearranged kernel data. Accordingly, even with the rearranged data 1211, an accurate operation result may be output from the operator.

If the kernel data 1220 is rearranged, the processor 420 rearranges the manipulated data 1210 in the same manner as described above and inputs the rearranged data to the operator.

Figure 13:
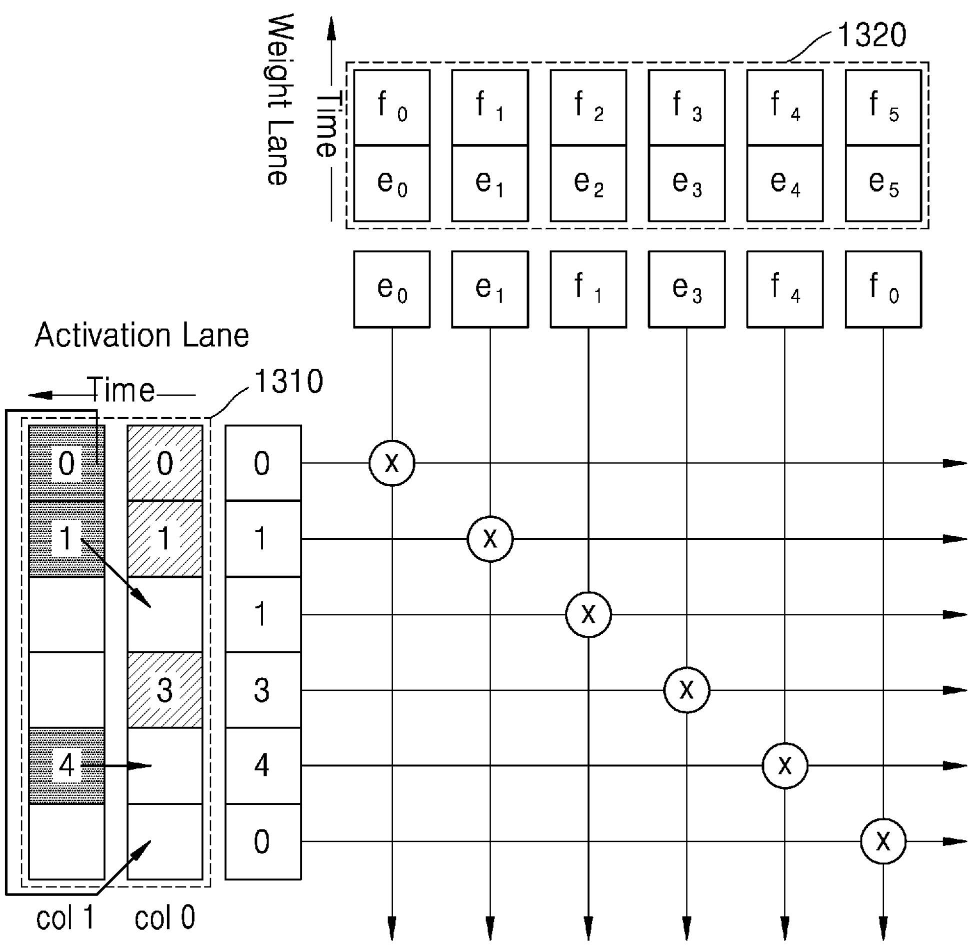
FIG. 13 is a diagram illustrating another example in which a processor rearranges manipulated data.

FIG. 13 is a diagram illustrating another example in which a processor rearranges manipulated data.

FIG. 13 illustrates manipulated data 1310 and kernel data 1320. Some of the manipulated data 1310 includes blanks. In addition, blanks are illustrated as being included only in the manipulated data 1310 in FIG. 13 but are not limited thereto. In other words, 0 may also be included in at least one of the weights included in the kernel data 1320.

The processor 420 may rearrange the manipulated data 1310 based on a form of sparsity of the manipulated data 1310. For example, the processor 420 may shift the first element (activation) of the column col 1 included in the manipulated data 1310 to a position of the last element (activation) of the column col 0 adjacent to the column col 1.

A first position of the columns col 1 and col 0 includes valid information. In addition, the last position of the column col 0 does not include the valid information. In this case, the processor 420 may shift an element at the first position of the column col 1 to the last position of the column col 0. Through this process, the processor 420 may prevent an unnecessary convolution operation from being performed.

When the manipulated data 1310 is rearranged, the kernel data 1320 may also be rearranged as described above with reference to FIGS. 9A through 12.

Figure 14:
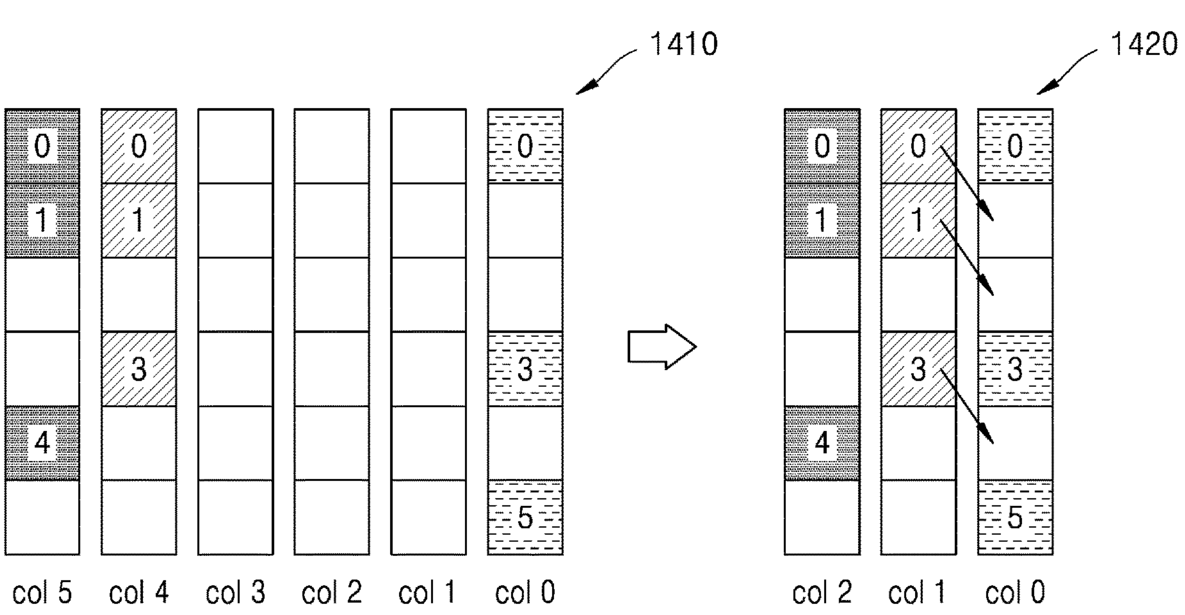
FIG. 14 is a diagram illustrating another example in which a processor rearranges manipulated data.

FIG. 14 is a diagram illustrating another example in which a processor rearranges manipulated data.

FIG. 14 illustrates manipulated data 1410. Some of the manipulated data 1410 includes blanks. Particularly, some columns col 1 to col 3 of the manipulated data 1410 are all configured by blanks only.

The processor 420 may rearrange the manipulated data 1410 based on a form of sparsity of the manipulated data 1410. For example, the processor 420 may rearrange the manipulated data 1410 such that processing for the columns col 1 to col 3 including only zeros among the plurality of columns col 0 to col 5 included in the manipulated data 1410 may be omitted.

For example, the processor 420 may omit the columns col 1 to col 3 from the manipulated data 1410 and generate the rearranged data 1420 with only the remaining columns col 0, col 4, and col 5. In addition, the processor 420 records in the memory 410 that the columns col 1 to col 3 are omitted. Through this process, the processor 420 may prevent an unnecessary convolution operation from being performed.

Meanwhile, when the manipulated data 1410 is rearranged, the kernel data may also be rearranged as described above with reference to FIGS. 9A through 12.

As described above, the apparatus 400 manipulates input data based on the input data and a configuration of hardware for processing the input data. Accordingly, the apparatus 400 may process data without an idle channel in the operator.

In addition, the apparatus 400 rearranges the manipulated data based on sparsity of the manipulated data. Accordingly, the apparatus 400 may output a valid result without performing an unnecessary operation, and thus, the total number of operations may be reduced while a desirable result is output.

The above-described method may be performed by a program that is executable in a computer and may be implemented by a general-purpose digital computer that executes a program by using a computer-readable recording medium. In addition, a structure of the data used in the above-described method may be recorded on the computer-readable recording medium through various means. The computer readable recording medium includes a storage medium such as a magnetic storage medium (for example, a ROM, a RAM, an USB, a floppy disk, a hard disk, and so on) or an optical reading medium (for example, a CD-ROM, a DVD, and so on).

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A hardware-accelerated processor-implemented method of processing neural network data for performing voice recognition, image recognition, or image classification, the method comprising:

receiving, by a processor including an operator implemented in hardware as a neural network hardware accelerator having a second number of channels, input data according to an input neural network task to be analyzed by the operator, the input data being represented as a matrix having a first number of input channels, the second number of channels being determined by a hardware configuration of the operator;

performing a convolution operation on the input data to generate input feature map data;

generating manipulated data from the input feature map data, based on a comparison result of the first number of input channels of the input feature map data with the second number of channels of the operator implemented in the hardware, the generating comprising:

adding one or more channels configured by zeros to the input feature map data to increase the first number of input channels to match the second number of channels of the operator so that idle channels in the operator are avoided;

shifting elements of one or more columns included in the input feature map data; and rearranging the manipulated data based on sparsity of the manipulated data to generate rearranged data to optimize operations of the operator, the rearranging comprising:

shifting elements of the input feature map data within the manipulated data to be positioned within the added one or more channels; and shifting elements of one or more columns included in the manipulated data to reduce blanks represented by zeros; and performing, by the operator implemented in the hardware, convolution operations on the rearranged data using each channel of the second number of channels of the operator to obtain a resulting analysis of the input data while reducing unnecessary operations caused by mismatched channels and sparsity.

2. The method of claim 1, wherein the adding of the one or more channels to the input feature map data is based on the comparison result indicating that an idle operator channel exists.

3. The method of claim 1, wherein the generating of the manipulated data is based on a value obtained by dividing the second number by the first number.

4. The method of claim 3, wherein the generating of the manipulated data comprises:

adding n channels as the one or more channels, each channel being configured by zeros, among the input channels, and wherein n is a natural numberless than or equal to a value obtained by dividing the second number by the first number and subtracting one.

5. The method of claim 1, wherein the shifting of elements of one or more columns included in the manipulated data is performed according to a specified rule.

6. The method of claim 5, wherein the specified rule includes shifting the elements of the one or more columns in the manipulated data by a specified size in a same direction, and wherein the specified rule is applied periodically to the one or more columns.

7. The method of claim 1, wherein the rearranging of the manipulated data includes shifting at least one element included in the manipulated data from a first position of a first column including the at least one element to a second position of a second column.

8. The method of claim 7, wherein the first position of the first column and the second position of the second column correspond to each other.

9. The method of claim 7, wherein the first position of the first column and the second position of the second column are different from each other.

10. A non-transitory computer-readable recording medium having recorded thereon a program for executing the method of claim 1 on a computer.

11. A hardware-accelerated apparatus for processing data for performing image recognition or image classification, the apparatus comprising:

a memory in which at least one program is stored; and a processor configured, the processor including an operator implemented in hardware as a neural network hardware accelerator having a second number of channels, to execute the at least one program to:

receiving input image data according to a recognition task to be analyzed by the operator implemented in the hardware, the input image data being represented as a matrix having a first number of input channels, the second number of channels being determined by a hardware configuration of the operator;

performing a convolution operation on the input image data to generate input feature map data;

generate manipulated data from the input feature map data, based on a comparison result of the first number of input channels of the input feature map data with the second number of channels of the operator implemented in the hardware, the generating comprising:

adding one or more channels configured by zeros to the input feature map data to increase the first number of input channels to match the second number of channels of the operator so that idle channels in the operator are avoided; and shifting elements of one or more columns included in the input feature map data; and rearrange the manipulated data based on sparsity of the manipulated data to generate rearranged data to optimize operations of the operator, the rearranging comprising:

shifting elements of the input feature map data within the manipulated data to be positioned within the added one or more channels; and shifting elements of one or more columns included in the manipulated data to reduce blanks represented by zeros; and perform, by the operator implemented in the hardware, convolution operations on the rearranged image data using each channel of the second number of channels of the operator to generate recognition results while reducing unnecessary operations caused by mismatched channels and sparsity.

12. The apparatus of claim 11, wherein the processor is configured to add the one or more channels to the input feature map data, the one or more channels to the input data being configured by zeros, to the input image data based on the comparison result.

13. The apparatus of claim 12, wherein the processor is configured to manipulate the input feature map data based on a value obtained by dividing the second number by the first number.

14. The apparatus of claim 13, wherein the processor is configured to add n channels, each channel being configured by zeros, between the input channels, and wherein n is a natural number less than or equal to the value obtained by dividing the second number by the first number and subtracting one.

15. The apparatus of claim 11, wherein shifting of elements of one or more columns included in the manipulated data is performed according to a specified rule.

16. The apparatus of claim 15, wherein the specified rule includes shifting the elements of the one or more columns in the manipulated data by a specified size in a same direction, and wherein the specified rule is applied periodically to the one or more columns.

17. The apparatus of claim 11, wherein the processor is configured to shift at least one element included in the manipulated data from a first position of a first column including the at least one element to a second position of a second column.

18. The apparatus of claim 17, wherein the first position of the first column and the second position of the second column correspond to each other.

19. The apparatus of claim 17, wherein the first position of the first column and the second position of the second column are different from each other.

20. A hardware-accelerated apparatus for performing voice recognition, comprising:

a memory; and a processor, the processor including an operator implemented in hardware as a neural network hardware accelerator having a second number of channels, configured to execute at least one program stored in the memory to:

obtaining, by the operator implemented in the hardware, audio data for a neural network trained to perform a voice recognition task on the audio data;

perform a convolution operation on the audio data to generate input feature map data, the input feature map data being represented as a matrix having a first number of input channels;

manipulate the input feature map data to generate first data based on a comparison result of the first number of input channels of the input feature map data with the second number of channels of the operator implemented in the hardware based on a value obtained by dividing the second number by the first number, the value indicating that the first number is not a multiple of the second number, the manipulating of the input feature map data comprising:

adding at least one input channel configured by zeros to the input feature map data based on the comparison result indicating that an idle operator channel exists so that the idle operator channel in the operator is avoided; and shifting elements of one or more columns included in the input feature map data;

generate second data by rearranging the first data based on a validity of elements included in the first data to reduce blanks represented by zeros;

perform, by the operator implemented in the hardware, one or more convolution operations in the neural network on the second data using each channel of the second number of channels of the operator to generate recognition results for the audio data while reducing unnecessary operations caused by mismatched channels and sparsity; and perform the voice recognition task on the audio data based on the recognition result from the operator.

21. The apparatus of claim 20, wherein generating the second data includes replacing at least one invalid element in the first data with a valid element.

22. The apparatus of claim 21, wherein the at least one invalid element is a zero and the valid element is a non-zero number.

* * * * *